Patented Nov. 11, 1924.

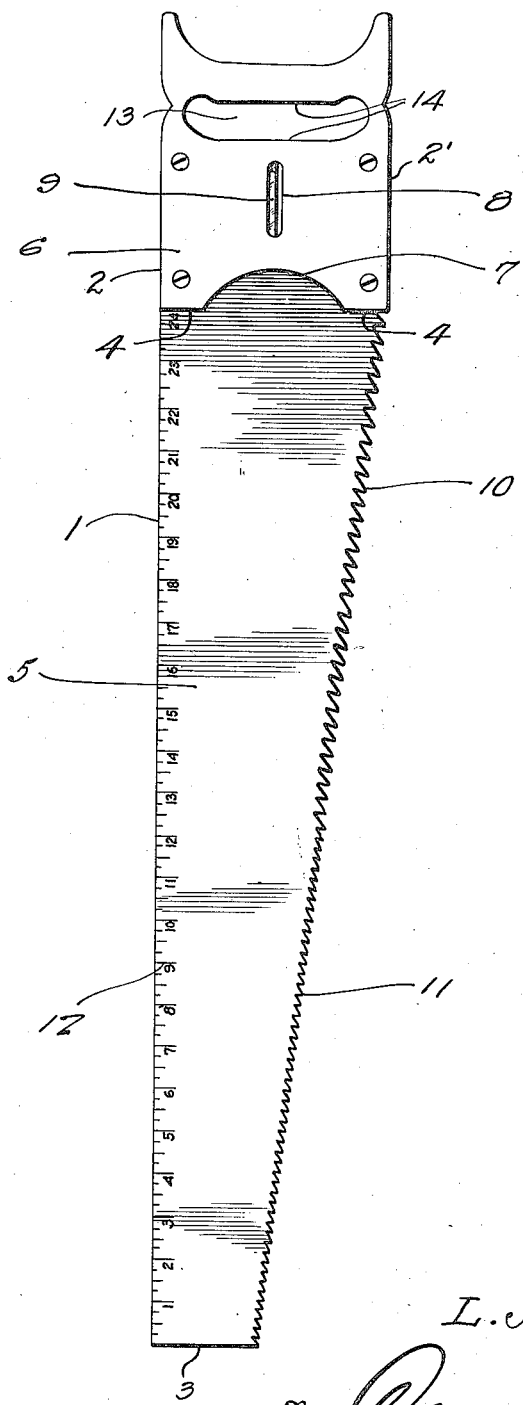

1,515,071

UNITED STATES PATENT OFFICE.

LOUIS J. ROTHBAUER, OF CHICAGO, ILLINOIS.

COMBINATION SAW.

Application filed January 2, 1924. Serial No. 684,089.

*To all whom it may concern:*

Be it known that I, LOUIS J. ROTHBAUER, a citizen of the United States, residing at Chicago, in the county of Cook and State of Illinois, have invented certain new and useful Improvements in Combination Saws, of which the following is a specification.

This invention relates to saws, and has for its primary object to provide an article of this nature wherein the same may be employed in the cutting of different grades of material and wherein the saw may be employed as a ruler, square, or level.

An additional object of the invention is to provide a saw embodying the above-entitled characteristics that may be manufactured and marketed at a cost no greater than that of other types of saws now upon the market.

With the above salient objects in view and others that will become apparent as the nature of the invention is better understood, the same comprises the provision of a saw as hereinafter more fully described, shown in the accompanying drawing, and claimed.

In the drawing, the figure is a plan view of a saw constructed in accordance with the present invention.

Now having particular reference to the drawing, 5 designates the saw blade, and 6 the handle thereof. The handle thereof is preferably composed of wood, and the upper and lower edges are straight as shown. The front edge of the handle is provided upon opposite sides of the blade 5 with curved notches 7 intermediate the upper and lower straight edges of the handle for providing guides for assisting in the marking of curved lines and the parts 4 projecting beyond these notches are alined at a right angle to the straight graduated edge, thus enabling the device to be used as a try-square. The handle is slotted at 8 for the reception of the liquid level gage 9 whereby the saw may be employed as a level, this level being parallel with the upper and lower edges of the handle and the upper edge of the blade. The lower edge of the saw blade 5 extends diagonally with respect to the upper edge of the blade which, as shown, is straight. This lower diagonal edge is provided with a series of large and small saw teeth 10 and 11 respectively for thus allowing the saw to be used for cutting different grades of material.

The upper straight edge of the saw is provided with graduation marks 12 whereby the said edge of the saw may be employed as a ruler.

The blade 5 is provided with an upper straight edge 1 and a straight end edge 3 which is disposed at a right angle to the longitudinal straight edge 1. The handle 6 is applied to the end of the blade opposite the end edge 3. The said handle is provided with an upper straight edge 2 and a lower straight edge 2'. The edge 2 is alined with the edge 1 of the blade. The liquid level 9 is located midway between the edges 2 and 2' of the handle and is disposed parallel with the said edges. The handle is further provided with a hand opening 13 having parallel side wall edges 14, which edges are disposed at right angles to the handle edges 2 and 2' and also parallel with the straight end edge 3 of the saw blade 5, and either of these edges 14 can therefore be used with either of the upper and lower handle edges 2 and 2' to mark a right angle, or as a try-square.

By this arrangement the saw may be held in the hand and the upper and lower edges of the handle will be disposed parallel with the median longitudinal dimension of the hand and parallel with the arm when the saw is in use. Also the arm will be disposed in alinement with the liquid level and thus the movement of the bubble in the level will indicate when the arm of the operator is disposed in other than a horizontal position. By this arrangement the saw may be used for accurately cutting incisions in material.

Having thus described my invention, what I claim as new and desire to secure by Letters Patent is:

A combined saw and laying-off instrument comprising a blade having a longitudinal straight edge and a straight end edge disposed at a right angle to the longitudinal straight edge, a handle applied to the end of the blade opposite that end thereof having the said transversely disposed straight edge, the said handle having parallel upper and lower edges, one of which is alined with the longitudinal straight edge of the blade, a liquid level carried by the handle and located midway between the upper and lower parallel edges and disposed parallel with said edges, the handle being provided with a hand opening having parallel side wall edges, the said hand opening edges being disposed at right angles to the upper and lower parallel edges of the said handle, and the said hand opening edges being disposed parallel with the transversely disposed straight edge at the end of the blade.

In testimony whereof I affix my signature.

LOUIS J. ROTHBAUER.